United States Patent
Alyami et al.

(10) Patent No.: US 12,487,147 B2
(45) Date of Patent: Dec. 2, 2025

(54) COMPOSITE WRAP FOR PIPE MONITORING AND REPAIR

(71) Applicant: Saudi Arabian Oil Company, Dhahran (SA)

(72) Inventors: Mazyad Alyami, Dammam (SA); Layan Alaeddin AlSharif, Dhahran (SA); Maher Hamed Alerwi, Dhahran (SA); Hasan Ali Al-Hashmy, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 442 days.

(21) Appl. No.: 18/125,546

(22) Filed: Mar. 23, 2023

(65) Prior Publication Data

US 2024/0319037 A1  Sep. 26, 2024

(51) Int. Cl.
*G01M 3/40* (2006.01)
*F16L 55/18* (2006.01)

(52) U.S. Cl.
CPC ............... *G01M 3/40* (2013.01); *F16L 55/18* (2013.01)

(58) Field of Classification Search
CPC .................................. F16L 55/18; G01M 3/40
USPC ........................................................... 138/99
See application file for complete search history.

(56) References Cited

U.S. PATENT DOCUMENTS

| | | | | |
|---|---|---|---|---|
| 4,517,234 A * | 5/1985 | Fisher | ................ | H02G 15/1813 138/158 |
| 5,302,936 A * | 4/1994 | Yaniger | ..................... | G01L 1/20 252/502 |
| 5,817,944 A * | 10/1998 | Chung | ...................... | G01L 1/20 73/768 |
| 6,418,333 B1 * | 7/2002 | Axelgaard | ............. | A61B 5/274 600/397 |
| 7,472,722 B2 | 1/2009 | Nadarajah et al. | | |
| 7,673,655 B1 * | 3/2010 | Morton | ............... | G01M 3/2815 138/98 |
| 7,921,727 B2 | 4/2011 | Rice | | |

(Continued)

FOREIGN PATENT DOCUMENTS

CN          107300435          10/2017
EP             2183330          10/2016

(Continued)

OTHER PUBLICATIONS

Castano et al., "Smart fabric sensors and e-textile technologies: a review," Smart Materials and Structures, Apr. 1, 2014, 23(5), 053001, 28 pages.

(Continued)

*Primary Examiner* — David R Deal
(74) *Attorney, Agent, or Firm* — Fish & Richardson P.C.

(57) ABSTRACT

A monitoring system includes a primer layer, a composite wrap, and an electrode assembly. The primer layer is configured to surround a pipe that is to be monitored. The primer layer is made of an electrically non-conductive adhesive material. The composite wrap is configured to wrap around the pipe over the primer layer. The composite wrap includes an electrically conductive nanomaterial dispersed throughout the composite wrap. The electrode assembly is coupled to the composite wrap. The electrode assembly and the electrically conductive nanomaterial are configured to monitor degradation of the composite wrap.

14 Claims, 6 Drawing Sheets

(56) References Cited

U.S. PATENT DOCUMENTS

| | | | |
|---|---|---|---|
| 8,726,737 | B2 | 5/2014 | Georgeson et al. |
| 9,057,473 | B2 | 6/2015 | Souza |
| 10,481,022 | B2 | 11/2019 | Servati et al. |
| 11,460,369 | B1* | 10/2022 | Zamanzadeh ....... G01M 5/0083 |
| 12,000,740 | B2 | 6/2024 | Cao et al. |
| 2005/0284232 | A1* | 12/2005 | Rice ................... G01M 5/0033 73/762 |
| 2006/0272724 | A1 | 12/2006 | Borland et al. |
| 2008/0272110 | A1* | 11/2008 | Kamiyama ......... F16L 55/1651 219/535 |
| 2011/0139351 | A1* | 6/2011 | Morton .................. F16L 55/18 156/185 |
| 2013/0061970 | A1* | 3/2013 | Green .................... B32B 27/08 138/99 |
| 2015/0185128 | A1 | 7/2015 | Chang et al. |
| 2017/0160243 | A1 | 6/2017 | Zhang et al. |
| 2024/0183419 | A1 | 6/2024 | AlSharif et al. |

FOREIGN PATENT DOCUMENTS

| | | |
|---|---|---|
| EP | 3346265 | 7/2018 |
| WO | WO 2018195295 | 10/2018 |

OTHER PUBLICATIONS

SAIP Examination Report in Saudi Arabian Appln. No. 123450932, dated Sep. 28, 2024, 11 pages, (with English Translation).

[No Author Listed], "Composite Wrap for Non-Leaking Pipeline Defects," from Natural Gas STAR Partners, United States Environmental Protection Agency, Oct. 2006, 11 pages.

Arronche L., et al. "Impact damage sensing of multiscale composites through epoxy matrix containing carbon nanotubes," Journal of Applied Polymer Science, 2012, 128(5): 2797-2806, 10 pages.

Bastola et al., "Recent progress of magnetorheological elastomers: a review," Smart Materials and Structures, 29(123002), 27 pages.

Bauhofer, et al., "A review and analysis of electrical percolation in carbon nanotube polymer composites," Composites Science And Technology, 69(10), 26 pages.

Berasategi et al., "Anisotropic behaviour analysis of silicone/carbonyl iron particles magnetorheological elastomers," Rheologica Acta, May 30, 2020, 59(7), 1 page, (abstract only).

Böger et al., "Load and health monitoring in glass fibre reinforced composites with an electrically conductive nanocomposite epoxy matrix," Composites Science and Technology, 2018, 68(7-8):1886-1894, 24 pages.

Christenson "In Sensors and Transducers," Handbook of Biomechatronics, Academic Press, 2019, (1):61-93, 33 pages.

Davison "Strain Gauges and the Wheatstone Bridge," University of the West of Scotland, 1997, 4 pages.

Djordjevic, "Nondestructive Test Technology for the Composites," Keynote Lecture, The 10th International Conference of the Slovenian Society for Non-Destructive Testing Application of Contemporary Non-Destructive Testing in Engineering, Ljubljana, Slovenia, Sep. 1-3, 2009, 259-265, 7 pages.

Dumitrescu et al., "Corrosion Repair of Pipelines Using Modern Composite Materials Systems: a Numerical Performance Evaluation," energies, MDPI, 2021, 14(615), 25 pages.

Gao, et al., "In situ sensing of impact damage in epoxy/glass fiber composites using percolating carbon nanotube networks," Carbon, 49(10): 3382-3385, abstract only.

Kchit et al., "Electrical resistivity mechanism in magnetorheological elastomer," Journal of Physics D: Applied Physics, Apr. 30, 2009, 42(10), 15 pages.

Kravchenko et al., "Incorporation of plasma-functionalized carbon nanostructures in composite laminates for interlaminar reinforcement and delamination crack monitoring," Journal of Physics and Chemistry of Solids, 2018, 112:163-170, 7 pages.

kyowa-ei.com, [online], "Relations between Transducer Output Signals in Strain and Voltage," KYOWA, available on or before Jan. 23, 2017, via Internet Archive: Wayback Machine URL <http://web.archive.org/web/20230000000000*/https://www.kyowa-ei.com/eng/technical/notes/transducers/strain_voltage.html>, retrieved on Jun. 22, 2023, URL <https://www.kyowa-ei.com/eng/technical/notes/transducers/strain_voltage.html>, 1 page.

Liao et al., "A comprehensive thermo-viscoelastic experimental investigation of Ecoflex polymer," Elsevier, Polymer Testing, Jun. 2020, 86:106478, 25 pages.

Lim et al., "An Overview of Corroded Pipe Repair Techniques Using Composite Materials," World Academy of Science, Engineering and Technology, International Journal of Materials and Metallurgical Engineering, 2016, 10(1), 7 pages.

Liu et al., "Enhanced delamination initiation stress and monitoring sensitivity of quasi-isotropic laminates under in-plane tension by interleaving with CNT buckypaper," Composites Part A: Applied Science and Manufacturing, Oct. 2016, 89, 8 pages.

Lozoya et al., "Design and Implementation of an IoT-Oriented Strain Smart Sensor with Exploratory Capabilities on Energy Harvesting and Magnetorheological Elastomer Transducers," Applied Sciences, Jun. 26, 2020, 10(4387), 28 pages.

Mikhalchan et al., "A perspective on high-performance CNT fibres for structural composites," Carbon, 150, 79 pages.

Moniruzzaman et al., "Polymer Nanocomposites Containing Carbon Nanotubes," Macromolecules, Jul. 7, 2006, 39(16):5194-5205, 12 pages.

Moucka et al., "Dielectric properties of magnetorheological elastomers with different microstructure," Applied Physics Letters, Mar. 19, 2018, 112(122901), 5 pages.

Nesreddine et al., "Optimization of the geometrical parameters of bonded composite wrap for repairing cracked pipelines," Frattura Ed Integrità Strutturale, Sep. 23, 2018, 46, 11 pages.

Qian et al., "Carbon nanotube-based hierarchical composites: a review," Journal of Materials Chemistry, May 1, 2010, 20(23): 4751-4762.

Samal et al., "Magnetorheological Elastomer Composites: The Influence of Iron Particle Distribution on the Surface Morphology," Macromolecular Symposia, Feb. 20, 2020, 389(1): 1900053, 4 pages.

Schnars U., et al., "Applications of NDT Methods on Composite Structures in Aerospace Industry," Conference on Damage in Composite Materials, Airbus Operations GmbH, Bremen, Germany, Sep. 2006, 11(12), 11 pages.

Thostenson et al., "Carbon Nanotube Networks: Sensing of Distributed Strain and Damage for Life Prediction and Self Healing," Advanced Materials, 18(21): 2837-2841, 6 pages, abstract only.

* cited by examiner

COMPOSITE WRAP FOR PIPE MONITORING AND REPAIR

TECHNICAL FIELD

This disclosure relates to pipe repair.

BACKGROUND

Materials (such as fluids) can be transported and distributed via pipes, which can span for hundreds or even thousands of kilometers. Such pipes can become damaged or may deteriorate due to several factors, such as corrosion, which can cause metal loss and subsequently leakage of the material that is being transported. In some cases, pipes are reinforced to strengthen the pipe and protect against potential damage. In some cases, pipes are monitored, such that damage can be detected. Once the damage has been detected, the pipe can be repaired or replaced.

SUMMARY

This disclosure describes technologies relating to pipe monitoring and repair. Certain aspects of the subject matter described can be implemented as a monitoring system. The monitoring system includes a primer layer, a composite wrap, and an electrode assembly. The primer layer is configured to surround a pipe that is to be monitored. The primer layer is made of an electrically non-conductive adhesive material. The composite wrap is configured to wrap around the pipe over the primer layer. The composite wrap includes an electrically conductive nanomaterial dispersed throughout the composite wrap. The electrode assembly is coupled to the composite wrap. The electrode assembly and the electrically conductive nanomaterial are configured to monitor degradation of the composite wrap.

This, and other aspects, can include one or more of the following features. The composite wrap can include a non-metallic composite layer and an adhesive layer. The adhesive layer can be disposed on the non-metallic composite layer. The electrically conductive nanomaterial can be dispersed throughout the adhesive layer. The electrode assembly can include a first soft metal electrode and a second soft metal electrode. The first soft metal electrode can be embedded in a first end of the adhesive layer. The second soft electrode can be embedded in a second end of the adhesive layer. The composite wrap can be wrapped over itself, such that multiple alternating layers of the adhesive layer and the non-metallic composite layer surround the pipe. The alternating layers can be sandwiched between the first soft metal electrode and the second soft metal electrode. The electrically conductive nanomaterial can include multi-walled carbon nanotubes. The non-metallic layer can include a resin that is reinforced with glass fiber, carbon fiber, aramid fiber, or any combinations of these. A ratio of the electrically conductive nanomaterial to the adhesive layer can be in a range of from about 0.5 weight percent (wt. %) to about 4 wt. %.

Certain aspects of the subject matter described can be implemented as a method. An electrically conductive nanomaterial is dispersed in an adhesive. The adhesive is applied onto a non-metallic composite layer. A first soft metal electrode is embedded in a first end of the adhesive. A second soft metal electrode is embedded in a second end of the adhesive, thereby forming a composite wrap. A pipe is covered with an electrically non-conductive adhesive material. After covering the pipe, the pipe is wrapped with the composite wrap.

This, and other aspects, can include one or more of the following features. Wrapping the pipe with the composite wrap can include wrapping the composite wrap over itself, such that multiple alternative layers of the adhesive and the non-metallic composite layer surround the pipe. The alternative layers can be sandwiched between the first soft metal electrode and the second soft metal electrode. The method can include measuring an electrical resistance across the first soft metal electrode and the second soft metal electrode to monitor a degradation of the composite wrap. The electrically conductive nanomaterial can include multi-walled carbon nanotubes. Measuring the electrical resistance across the first soft metal electrode and the second soft metal electrode can include measuring the electrical resistance across the multi-walled carbon nanotubes. The electrical resistance across the first soft metal electrode and the second soft metal electrode can be measured by a multimeter coupled to the first soft metal electrode and the second soft metal electrode. The multimeter can be communicatively coupled to a computer. The multimeter can be configured to transmit the measured electrical resistance to the computer. The electrically conductive nanomaterial can be dispersed in the adhesive, such that a ratio of the electrically conductive nanomaterial to the adhesive is in a range of from about 0.5 wt. % to about 4 wt. %.

Certain aspects of the subject matter described can be implemented as a method. A primer layer is applied on a pipe. The primer layer is made of an electrically non-conductive adhesive material. After applying the primer layer, the pipe is wrapped with a composite wrap. The composite wrap includes an electrically conductive nanomaterial dispersed throughout the composite wrap. An electrode assembly is coupled to the composite wrap. The electrode assembly measures an electrical resistance across the composite wrap to monitor a degradation of the composite wrap. The degradation of the composite wrap is determined in response to an increase in the electrical resistance across the composite wrap.

This, and other aspects, can include one or more of the following features. The composite wrap can include a non-metallic composite layer and an adhesive layer. The adhesive layer can be disposed on the non-metallic composite layer. The electrically conductive nanomaterial can be dispersed throughout the adhesive layer. The electrode assembly can include a first soft metal electrode and a second soft metal electrode. Coupling the electrode assembly to the composite wrap can include embedding the first soft metal electrode in a first end of the adhesive layer. Coupling the electrode assembly to the composite wrap can include embedding the second soft metal electrode in a second end of the adhesive layer. Wrapping the pipe with the composite wrap can include wrapping the composite wrap over itself, such that multiple alternating layers of the adhesive layer and the non-metallic composite layer surround the pipe. The composite wrap can be wrapped over itself, such that the alternating layers are sandwiched between the first soft metal electrode and the second metal electrode. The electrically conductive nanomaterial can include multi-walled carbon nanotubes. The electrically conductive nanomaterial can be dispersed throughout the adhesive layer, such that a ratio of the electrically conductive nanomaterial to the adhesive layer is in a range of from about 0.5 weight percent (wt. %) to about 4 wt. %. The electrical resistance across the composite wrap can be measured by a multimeter coupled to the first soft metal electrode and the second soft metal electrode. The multimeter can be communicatively coupled to a computer. The multimeter can be configured to transmit the measured electrical resistance to the computer.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes a composite wrap for repairing damaged pipe. The composite wrap includes a primer layer, a nanotube-enhanced adhesive, a composite layer, and soft metal electrodes (SMEs) embedded into the composite layer. The primer layer covers the damaged pipe and serves as an insulating layer. The adhesive and composite layer wrap around the primer layer, such that multiple alternating layers of adhesive and composite surround the pipe. A first SME is embedded at a first end of the composite layer, and a second SME is embedded at a second end of the composite layer, such that the alternating layers of adhesive and composite are sandwiched between the SMEs. The SMEs can be connected to a multimeter to measure changes in electrical resistance across the SMEs for real-time monitoring of damage initiation and progression, such as delamination.

The subject matter described in this disclosure can be implemented in particular implementations, so as to realize one or more of the following advantages. The composite wrap, pipe monitoring system, and methods described here can be implement pipe repair and pipe health monitoring. The composite wrap described here includes electrically conductive nanomaterial which can be incorporated throughout the composite wrap. Inclusion of the electrically conductive nanomaterial in the composite wrap allows for changes in electrical resistance to be monitored. Such changes can indicate damage/degradation initiation and/or propagation. Once the damage and/or degradation has been detected, the pipe and/or composite wrap can be repaired. Inclusion of the electrically conductive nanomaterial allows for signal penetration throughout the composite wrap, which can be difficult to achieve with conventional sensors that are positioned exterior to conventional pipe repair wraps.

Figure 1A:
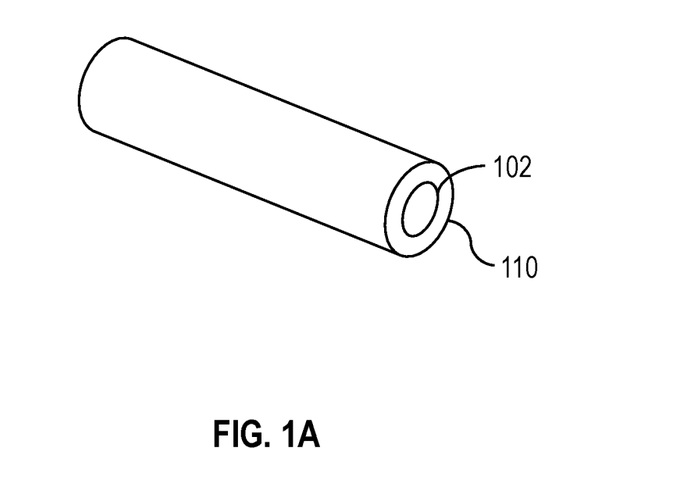
FIG. 1A is a schematic diagram of an example pipe with an example composite wrap.
Figure 1B:
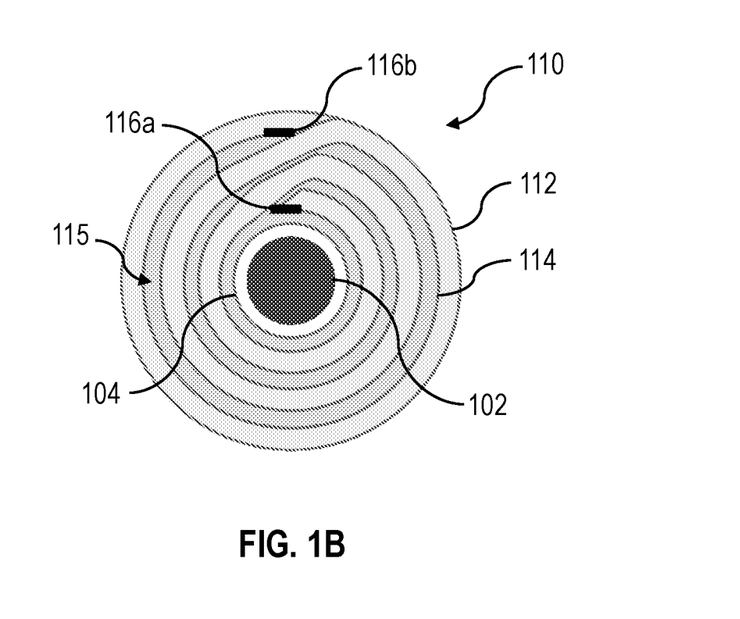
FIG. 1B is a cross-sectional view of the pipe with the composite wrap of FIG. 1A.

FIG. 1A is a schematic diagram of a pipe 102 with a composite wrap 110, and FIG. 1B shows a cross-sectional view of the pipe 102 with the composite wrap 110. The composite wrap 110 can be used to repair the damaged pipe 102. Once the composite wrap 110 has been installed on the pipe 102, the health of the composite wrap 110 can be monitored to ensure safe and reliable operations for material transport through the pipe 102. A primer layer 104 surrounds the pipe 102. The primer layer 104 is made of an electrically non-conductive adhesive material. The primer layer 104 serves as electrical insulation for the pipe 102. The composite wrap 110 wraps around the pipe 102 over the primer layer 104. The composite wrap 110 includes an electrically conductive nanomaterial 115 that is dispersed throughout the composite wrap 110. An electrode assembly 116a, 116b is coupled to the composite wrap 110. The electrode assembly 116a, 116b is configured to monitor a state (for example, damage and/or degradation) of the pipe 102 and/or the composite wrap 110. The electrode assembly 116a, 116b can include a first soft metal electrode 116a and a second soft metal electrode 116b.

In some implementations, the composite wrap 110 includes a non-metallic composite layer 112 and an adhesive layer 114. The electrically conductive nanomaterial 115 can be dispersed throughout the adhesive layer 114. In some implementations, as shown in FIG. 1B, the composite wrap 110 is wrapped over itself, such that multiple alternating layers of the adhesive layer 114 and the non-metallic composite layer 112 surround the pipe 102. In some implementations, as shown in FIG. 1B, the composite wrap 110 is wrapped over itself, such that the multiple alternating layers of the adhesive layer 114 and the non-metallic composite layer 112 are sandwiched between the soft metal electrodes 116a, 116b.

The primer layer 104 is insoluble in various mediums. For example, the primer layer 104 is compatible with the fluid flowing in the pipe 102, such that the primer layer 104 is insoluble in and is chemically inert in relation to (that is, does not chemically react with) the fluid flowing in the pipe 102. The primer layer 104 can exhibit high load-bearing capability. The primer layer 104 can exhibit high creep resistance under constant and/or varying forces. In some implementations, the primer layer 104 includes an epoxy resin, acrylate, polyurethane, or any combinations of these. In some implementations, the primer layer 104 has a thickness in a range of from about 0.01 millimeters (mm) to about 0.4 mm, or from about 0.03 mm to about 0.38 mm.

In some implementations, the non-metallic composite layer 112 includes a resin that is reinforced with a strengthening material, such as glass fiber, carbon fiber, aramid fiber, or any combination of these. The resin can include, for example, epoxy, polyethylene, polystyrene, polyurethane, or any combinations of these. In some implementations, the non-metallic composite layer 112 has a thickness in a range of from about 1 mm to about 4 mm. The resin in the non-metallic composite layer 112 can transfer stress between fibers of the strengthening material and can serve as an adhesive for holding the fibers of the strengthening material together. Further, the resin in the non-metallic composite layer 112 can protect the fibers of the strengthening material from mechanical and/or environmental damage.

In some implementations, the adhesive layer 114 includes a resin. For example, the adhesive layer 114 can include epoxy, polyethylene, polystyrene, polyurethane, or any combinations of these. In some implementations, the adhesive layer 114 has the same or similar composition as the resin of the non-metallic composite layer 112. In some implementations, the adhesive layer 114 has a thickness in a range of from about 0.001 mm to about 0.2 mm, or from about 0.005 to about 0.15 mm. The adhesive layer 114 can improve interfacial strength between layers of the composite wrap 110.

The electrically conductive nanomaterial 115 is compatible with the various layers (112, 114) of the composite wrap 110. In some implementations, the electrically conductive nanomaterial 115 includes carbon nanotubes, such as multi-walled carbon nanotubes. Multi-walled carbon nanotubes can include multiple rolled layers of graphene and can exhibit several advantages over single-walled (regular) carbon nanotubes, such as increased flexibility and ease in mass production, greater mechanical strength, and enhanced thermal and/or chemical stability. However, multi-walled carbon nanotubes may exhibit lower conductivity in comparison to single-walled carbon nanotubes. In cases where higher conductivity is preferred over mechanical strength and cost, the electrically conductive nanomaterial 115 can include single-walled carbon nanotubes instead of multi-walled carbon nanotubes. The electrically conductive nanomaterial 115 can include nanofillers, such as carbon black, graphite, aluminum oxide, silver, or any combinations of these. In some implementations, the electrically conductive nanomaterial 115 is dispersed throughout the adhesive layer 114 by manually mixing with the resin making up the adhesive layer 114. In some implementations, the electrically conductive nanomaterial 115 is dispersed throughout the adhesive layer 114 by a calender (for example, by a three-roll calender mill). In some implementations, a ratio of the electrically conductive nanomaterial 115 to the adhesive layer 114 is in a range of from about 0.5 weight percent (wt. %) to about 4 wt. %.

In some implementations, each of the soft metal electrodes 116a, 116b include a metal and a thin polymer substrate. The metal of the soft metal electrodes 116a, 116b are electrically conductive. The metal can be, for example, gold, silver, or carbon steel. The thin polymer substrate is soft, flexible, and compatible with the metal that is physically or chemically deposited on the thin polymer substrate. The thin polymer substrate can be made of, for example, polyethylene terephthalate (PET), polyethylene naphthalate (PEN), polyimide (PI), polycarbonate (PC), or any combinations of these. In some implementations, each of the soft metal electrodes 116a, 116b are made by additive manufacturing and/or in-situ growth of metal patterns by chemical reactions. For example, the metallic portions of the soft metal electrodes 116a, 116b can be synthesized, and then the metallic portions can be deposited (for example, by coating, printing, or spin-coating) onto the thin polymer substrate. As another example, in print-based processing, metallic pastes or inks can be deposited onto the thin polymer substrates and patterned, for example, by nozzle movement.

Although shown in FIG. 1A as being wrapped over itself twice such that there are three pairs of alternating non-metallic composite layer 112 and adhesive layer 114, the composite wrap 110 can be wrapped over itself fewer times (such as once) or additional times (such as three, four, or more than four times). For example, the composite wrap 110 can be wrapped over itself once, such that there are two pairs of alternating non-metallic composite layer 112 and adhesive layer 114. As another example, the composite wrap 110 can be wrapped over itself three times, such that there are four pairs of alternating non-metallic composite layer 112 and adhesive layer 114. In some implementations, the entire thickness of the composite wrap 110 wrapped over itself around the pipe 102 (that is, including all alternating layers) is in a range of from about 1 centimeter (cm) to about 15 cm, or from about 3 cm to about 12 cm.

Figure 2:
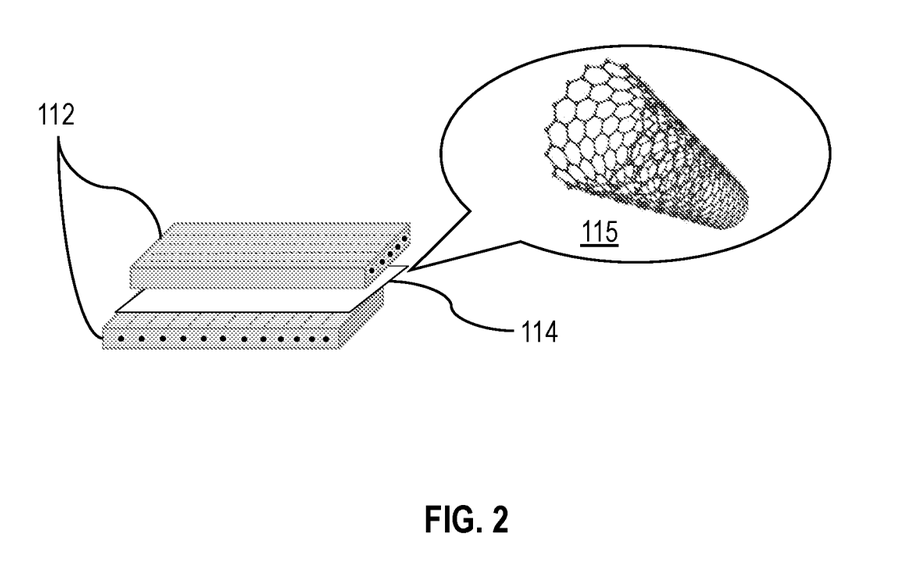
FIG. 2 is a schematic diagram of multiple layers of an example composite wrap.

FIG. 2 is a schematic diagram of multiple layers of the composite wrap 110. The portion of the composite wrap 110 that is shown in FIG. 2 includes one layer of the adhesive layer 114 sandwiched between two layers of the non-metallic composite layer 112. As described previously, the electrically conductive nanomaterial 115 is dispersed throughout the adhesive layer 114. The electrically conductive nanomaterial 115 can be dispersed by various processes, such as ultrasound radiation, mechanical stirring, or a combination of both. The non-metallic composite layer 112 can be fabricated by impregnating reinforced sheets of fiber (of the strengthening material) with polymer resins. The strengthening material can exhibit anisotropic characteristics to enhance mechanical properties of the non-metallic composite layer 112.

Figure 3:
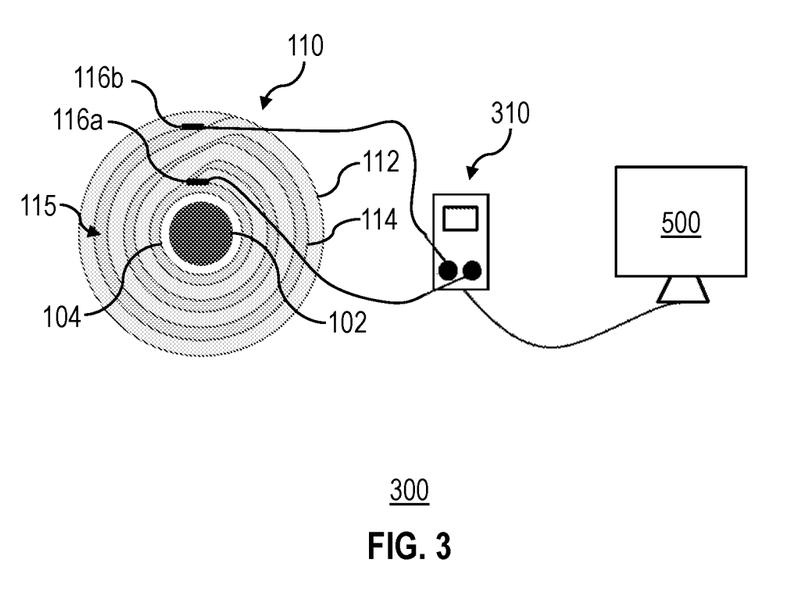
FIG. 3 is a schematic diagram of an example system including an example pipe with an example composite wrap connected to an example computer system for monitoring the pipe.
Figure 5:
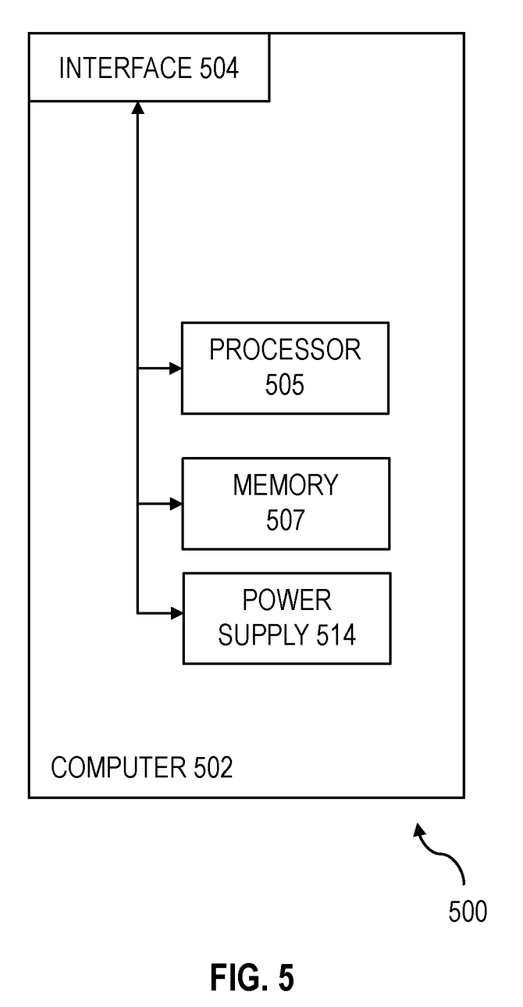
FIG. 5 is a block diagram of an example computer system.

FIG. 3 is a schematic diagram of a system 300 including the pipe 102 with the composite wrap 110 connected to a computer system 500 for monitoring the pipe 102. The system 300 includes a multimeter 310 and the computer system 500. The multimeter 310 can be connected to the soft metal electrodes 116a, 116b. The multimeter 310 can measure an electrical resistance across the soft metal electrodes 116a, 116b. The multimeter 310 can be an analog multimeter or a digital multimeter. The multimeter 310 can be configured to obtain various electrical measurements, such as voltage, current, and resistance. The multimeter 310 can measure the electrical resistance across the soft metal electrodes 116a, 116b, for example, via the electrical conductance through the electrically conductive nanomaterial 115 that is dispersed throughout the adhesive layer 114. As shown in FIG. 3, the multimeter 310 can be communicatively coupled to the computer system 500 for continuous monitoring of the pipe 102. The multimeter 310 can be configured to transmit the measured electrical resistance of the composite wrap 110 to the computer system 500, and the computer system 500 can be configured to store and analyze the electrical resistance measurement received from the multimeter 310. For example, the computer system 500 can store a first electrical resistance measurement received from the multimeter 310 as an original electrical resistance value and then compare a second electrical resistance measurement received from the multimeter 310 to the original electrical resistance value to see if the electrical resistance of the composite wrap 110 has changed. The computer system 500 can, for example, be configured to display a notification in response to detecting a change in electrical resistance across the composite wrap 110. As one example, an increase in electrical resistance can indicate an initiation of damage and/or damage growth in the composite wrap 110 and/or pipe 102.

In some implementations, the computer system 500 is configured to categorize a measured electrical resistance to determine a remedial strategy. For example, via experimentation (such as 3-point pending testing), electrical resistance measurements can be correlated with level of damage in the composite wrap 110 to determine resistance criticality values. As one example, the measured electrical resistance can be categorized into four categories attributed with different resistance criticality ranges. Table 1 provides a description of each of the categories and corresponding remedial strategies. If the resistance criticality is determined to be less than 25% (Category 1), then the likelihood of damage to the composite wrap 110 is low, and no action may be necessary. The alarm light can, for example, be green (no action necessary). If the resistance criticality is determined to be in a range of from 25% up to (and not including) 50% (Category 2), then damage to the composite wrap 110 may be imminent with continued use of the pipe 102, and a repair plan may be put together. The alarm light can, for example, be yellow (continue monitoring). If the resistance criticality is determined to be in a range of from 50% to 75%, damage is either imminent or has already occurred, and repair of the pipe 102 and/or composite wrap 110 should be initiated. The alarm light can, for example, be orange (commence repair). If the resistance critically is determined to be greater than 75%, then use of the pipe 102 should be shutdown, and repair of the pipe 102 and/or composite wrap 110 is initiated. The alarm light can, for example, be red (shutdown and commence repair).

Figure 4A:
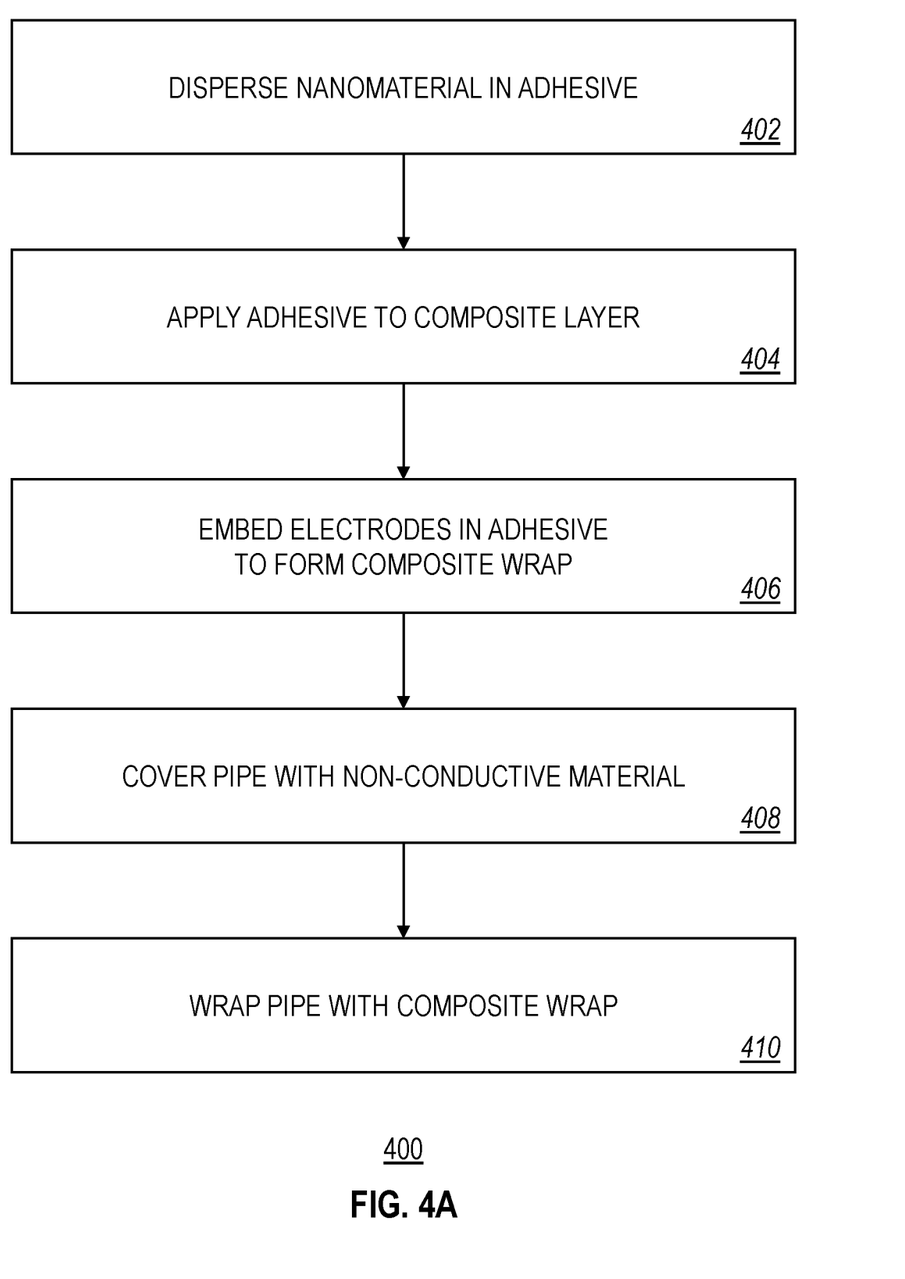
FIG. 4A is a flow chart of an example method for wrapping a pipe with an example composite wrap.

FIG. 4A is a flow chart of an example method 400 for wrapping a pipe (such as the pipe 102) with a composite wrap (such as the composite wrap 110). At block 402, an electrically conductive nanomaterial (such as the electrically conductive nanomaterial 115) is dispersed throughout an adhesive (such as the adhesive layer 114). At block 404, the adhesive layer 114 is applied onto a non-metallic composite layer (such as the non-metallic composite layer 112). At block 406, a first soft metal electrode 116a is embedded in a first end of the adhesive layer 114 and a second soft metal electrode 116b is embedded in a second end of the adhesive layer 114. Embedding the soft metal electrodes 116a, 116b in the adhesive layer 114 at block 406 forms the composite wrap 110. At block 408, the pipe 102 is covered with an electrically non-conductive adhesive material (such as the primer layer 104). After covering the pipe 102 with the primer layer 104 at block 408, the pipe 102 is wrapped with the composite wrap 110 at block 410. In some implementations, wrapping the pipe 102 with the composite wrap 110 at block 410 includes wrapping the composite wrap 110 over itself, such that multiple alternating layers of the adhesive layer 114 and the non-metallic composite layer 112 surround the pipe 102, and the multiple alternating layers are sandwiched between the first soft metal electrode 116a and the second metal electrode 116b (an example is shown in FIGS. 1B and 3). In some implementations, the method 400 includes measuring an electrical resistance across the first soft metal electrode 116a and the second metal electrode 116b to monitor a state of the pipe 102. For example, the electrical resistance can be measured by the multimeter 310 shown in FIG. 3.

Figure 4B:
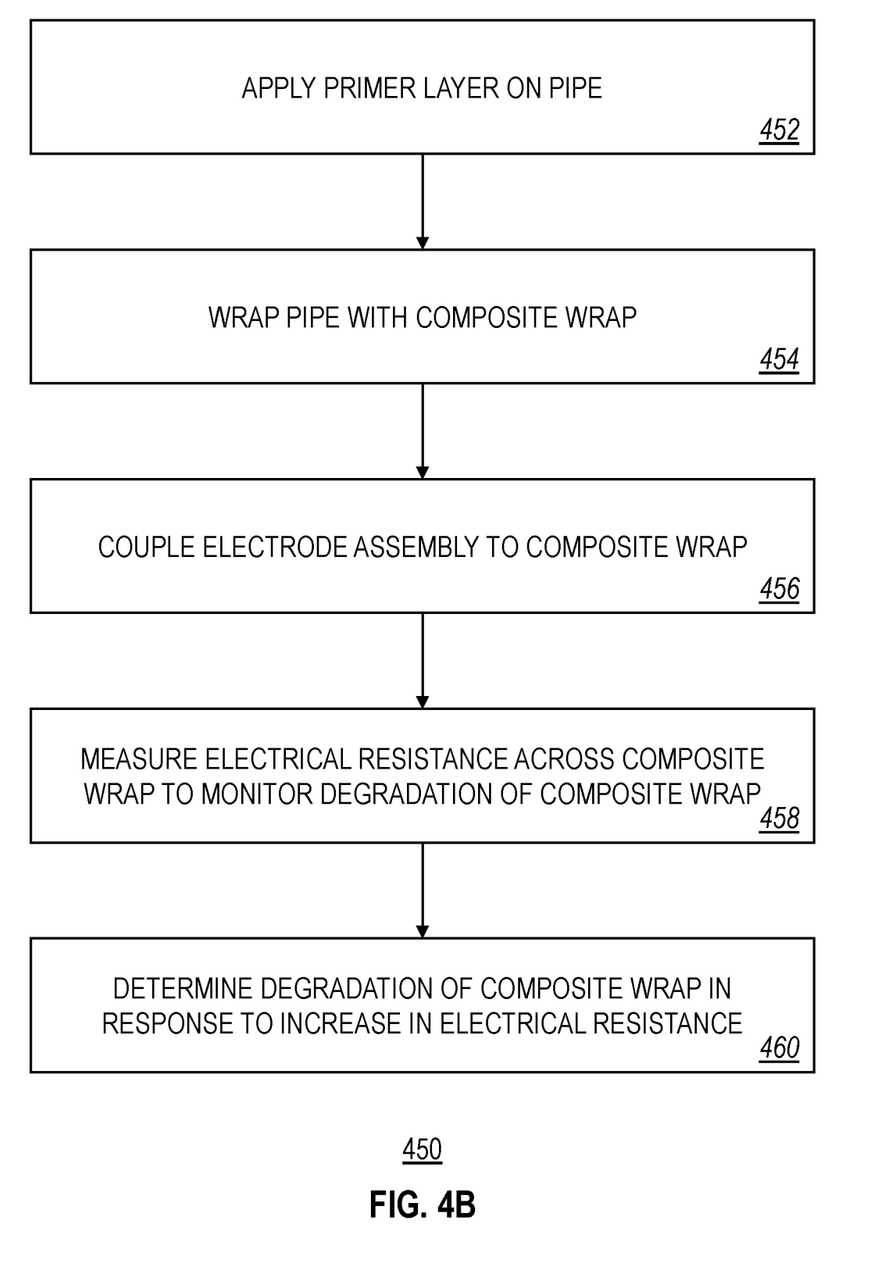
FIG. 4B is a flow chart of an example method for monitoring a pipe.

FIG. 4B is a flow chart of an example method 450 for monitoring a pipe (such as the pipe 102). The system 300 can, for example, implement the method 450. At block 452, a primer layer (such as the primer layer 104) is applied on the pipe 102. After applying the primer layer 104 at block 452, the pipe 102 is wrapped with a composite wrap (such as the composite wrap 110) at block 454. As described previously, the composite wrap 110 includes an electrically conductive nanomaterial (such as the electrically conductive nanomaterial 115) dispersed throughout the composite wrap 110 (for example, throughout the adhesive layer 114 of the composite wrap 110). At block 456, an electrode assembly (such as the first and second soft metal electrodes 116a, 116b coupled to the multimeter 310) is coupled to the composite wrap 110. Coupling the electrode assembly to the composite wrap 110 at block 456 can include embedding the first soft metal electrode 116a in a first end of the adhesive layer 114 and embedding the second soft metal electrode 116b in a second end of the adhesive layer 114. In some implementations, wrapping the pipe 102 with the composite wrap 110 at block 454 includes wrapping the composite wrap 110 over itself, such that multiple alternating layers of the adhesive layer 114 and the non-metallic composite layer 112 surround the pipe 102, and the multiple alternating layers are sandwiched between the first soft metal electrode 116a and the second metal electrode 116b (an example is shown in FIGS. 1B and 3). At block 458, the electrode assembly 116a, 116b, 310 measures an electrical resistance across the composite wrap 110 to monitor a state (such as damage and/or degradation) of the composite wrap 110. The electrical resistance across the composite wrap 110 can be measured at block 458 by a multimeter (such as the multimeter 310) coupled to the first and second soft metal electrodes 116a, 116b. In some implementations, the electrical resistance across the composite wrap 110 measured at block 458 is transmitted, for example, from the multimeter 310 to the computer system 500. At block 460, the state (such as damage and/or degradation) of the composite wrap 110 is determined in response to an increase in the electrical resistance across the composite wrap 110. The computer system 500 can store and analyze the measured electrical resistance(s) received from the multimeter 310. For example, the computer system 500 can compare the measured electrical resistance to previous measurements to detect a change in electrical resistance across the composite wrap 110. An increase, for example, can indicate that damage to the pipe 102 and/or the composite wrap 110 has occurred and/or is getting worse. The computer system 500 or an operator can, for example, implement block 460.

Although the flow charts for methods 400 and 450 shown in FIGS. 4A and 4B, respectively, include arrows between blocks, the methods 400 and 450 do not necessarily proceed in sequential order. The flow charts for methods 400 and 450 shown in FIGS. 4A and 4B, respectively, are specific implementations of the respective methods, but individual blocks can occur in an order different from those shown in FIGS. 4A and 4B. As one example, block 456 can occur prior to block 454. Further, the individual blocks of the methods 400 and 450 can occur simultaneously with one or more of the other blocks in the respective methods.

FIG. 5 is a block diagram of an example computer system 500 used to provide computational functionalities associated with described algorithms, methods, functions, processes, flows, and procedures, as described in this specification, according to an implementation. The illustrated computer 502 is intended to encompass any computing device such as a server, desktop computer, laptop/notebook computer, one or more processors within these devices, or any other processing device, including physical or virtual instances (or both) of the computing device. Additionally, the computer 502 can include a computer that includes an input device, such as a keypad, keyboard, touch screen, or other device that can accept user information, and an output device that conveys information associated with the operation of the computer 502, including digital data, visual, audio information, or a combination of information.

The computer 502 includes an interface 504. Although illustrated as a single interface 504 in FIG. 5, two or more interfaces 504 may be used according to particular needs, desires, or particular implementations of the computer 502. Although not shown in FIG. 5, the computer 502 can be communicably coupled with a network. The interface 504 is used by the computer 502 for communicating with other systems that are connected to the network in a distributed environment. Generally, the interface 504 comprises logic encoded in software or hardware (or a combination of software and hardware) and is operable to communicate with the network. More specifically, the interface 504 may comprise software supporting one or more communication protocols associated with communications such that the network or interface's hardware is operable to communicate physical signals within and outside of the illustrated computer 502. The interface 504 can include a control interface, which can be used to couple the computer 502 to controls.

In some implementations, the control interface is a bank of relays, a bank of MOSFET power controllers, a serial peripheral interface (SPI), or a Fieldbus, and the like. The interface 504 can include a sensor interface, which can be used to couple the computer 502 to sensors. In some implementations, the sensor interface is a bank of analog-to-digital converters (ADCs), and I2C bus, a serial peripheral interface (SPI) bus, or a Fieldbus, and the like. The interface 504 can include a human machine interface, which can be used by a user to interact with the computer 502. In some implementations, the human machine interface includes a monitor or a touch screen that is configured to display information, for example, to a user.

The computer 502 includes a processor 505. The processor 505 may be a microprocessor, a multi-core processor, a multithreaded processor, an ultra-low-voltage processor, an embedded processor, or a virtual processor. In some embodiments, the processor 505 may be part of a system-on-a-chip (SoC) in which the processor 505 and the other components of the computer 502 are formed into a single integrated electronics package. In some implementations, the processor 505 may include processors from Intel® Corporation of Santa Clara, California, from Advanced Micro Devices, Inc. (AMD) of Sunnyvale, California, or from ARM Holdings, LTD., Of Cambridge, England. Any number of other processors from other suppliers may also be used. Although illustrated as a single processor 505 in FIG. 5, two or more processors may be used according to particular needs, desires, or particular implementations of the computer 502. Generally, the processor 505 executes instructions and manipulates data to perform the operations of the computer 502 and any algorithms, methods, functions, processes, flows, and procedures as described in this specification. The processor 505 may communicate with other components of the computer 502 over a bus. The bus may include any number of technologies, such as industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in an SoC based system. Other bus technologies may be used, in addition to, or instead of, the technologies above.

The computer 502 also includes a memory 507 that can hold data for the computer 502 or other components (or a combination of both) that can be connected to the network. Although illustrated as a single memory 507 in FIG. 5, two or more memories 507 (of the same or combination of types) can be used according to particular needs, desires, or particular implementations of the computer 502 and the described functionality. While memory 507 is illustrated as an integral component of the computer 502, memory 507 can be external to the computer 502. The memory 507 can be a transitory or non-transitory storage medium. In some implementations, such as in PLCs and other process control units, the memory 507 is integrated with the database 506 used for long-term storage of programs and data. The memory 507 can include any number of volatile and non-volatile memory devices, such as volatile random-access memory (RAM), static random-access memory (SRAM), flash memory, and the like. In smaller devices, such as PLCs, the memory 507 may include registers associated with the processor 505 itself.

The memory 507 stores computer-readable instructions executable by the processor 505 that, when executed, cause the processor 505 to perform operations, such as receive a measured electrical resistance from the multimeter 310, store in the memory 507 the electrical resistance measurement received from the multimeter 310, and compare the electrical resistance measurement received from the multimeter 310 from a previous electrical resistance measurement received from the multimeter 310 to determine a status of the pipe 102. The computer 502 can also include a power supply 514. The power supply 514 can include a rechargeable or non-rechargeable battery that can be configured to be either user- or non-user-replaceable. The power supply 514 can be hard-wired. There may be any number of computers 502 associated with, or external to, a computer system containing computer 502, each computer 502 communicating over the network. Further, the term "client," "user," "operator," and other appropriate terminology may be used interchangeably, as appropriate, without departing from this specification. Moreover, this specification contemplates that many users may use one computer 502, or that one user may use multiple computers 502.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any subcombination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A monitoring system comprising:
   a primer layer configured to surround a pipe to be monitored, the primer layer made of an electrically non-conductive adhesive material;
   a composite wrap configured to wrap around the pipe over the primer layer, the composite wrap comprising an electrically conductive nanomaterial dispersed throughout the composite wrap; and
   an electrode assembly coupled to the composite wrap, the electrode assembly and the electrically conductive nanomaterial configured to monitor degradation of the composite wrap.

2. The monitoring system of claim 1, wherein the composite wrap comprises a non-metallic composite layer and an adhesive layer disposed on the non-metallic composite layer, wherein the electrically conductive nanomaterial is dispersed throughout the adhesive layer.

3. The monitoring system of claim 2, wherein the electrode assembly comprises a first soft metal electrode and a second soft metal electrode, the first soft metal electrode embedded in a first end of the adhesive layer, the second soft metal electrode embedded in a second end of the adhesive layer.

4. The monitoring system of claim 3, wherein the composite wrap is wrapped over itself, such that a plurality of alternating layers of the adhesive layer and the non-metallic composite layer surround the pipe, and the plurality of alternating layers are sandwiched between the first soft metal electrode and the second soft metal electrode.

5. The monitoring system of claim 4, wherein the electrically conductive nanomaterial comprises multi-walled carbon nanotubes.

6. The monitoring system of claim 4, wherein the non-metallic composite layer comprises a resin reinforced with glass fiber, carbon fiber, aramid fiber, or any combinations thereof.

7. The monitoring system of claim 4, wherein a ratio of the electrically conductive nanomaterial to the adhesive layer is in a range of from about 0.5 weight percent (wt. %) to about 4 wt. %.

8. A method comprising:
   applying a primer layer on a pipe, the primer layer made of an electrically non-conductive adhesive material;
   after applying the primer layer, wrapping the pipe with a composite wrap, the composite wrap comprising an electrically conductive nanomaterial dispersed throughout the composite wrap;
   coupling an electrode assembly to the composite wrap;
   measuring, by the electrode assembly, an electrical resistance across the composite wrap to monitor a degradation of the composite wrap; and
   determining the degradation of the composite wrap in response to an increase in the electrical resistance across the composite wrap.

9. The method of claim 8, wherein the composite wrap comprises a non-metallic composite layer and an adhesive layer disposed on the non-metallic composite layer, wherein the electrically conductive nanomaterial is dispersed throughout the adhesive layer.

10. The method of claim 9, wherein:
    the electrode assembly comprises a first soft metal electrode and a second soft metal electrode;
    coupling the electrode assembly to the composite wrap comprises embedding the first soft metal electrode in a first end of the adhesive layer; and
    coupling the electrode assembly to the composite wrap comprises embedding the second soft metal electrode in a second end of the adhesive layer.

11. The method of claim 10, wherein wrapping the pipe with the composite wrap comprises wrapping the composite wrap over itself, such that a plurality of alternating layers of the adhesive layer and the non-metallic composite layer surround the pipe, and the plurality of alternating layers are sandwiched between the first soft metal electrode and the second metal electrode.

12. The method of claim 11, wherein the electrically conductive nanomaterial comprises multi-walled carbon nanotubes.

13. The method of claim 11, wherein the electrically conductive nanomaterial is dispersed throughout the adhesive layer, such that a ratio of the electrically conductive nanomaterial to the adhesive layer is in a range of from about 0.5 weight percent (wt. %) to about 4 wt. %.

14. The method of claim 11, wherein the electrical resistance across the composite wrap is measured by a multimeter coupled to the first soft metal electrode and the second soft metal electrode, the multimeter communicatively coupled to a computer, the multimeter configured to transmit the measured electrical resistance to the computer.

* * * * *